(12) United States Patent
Hayashi

(10) Patent No.: US 6,403,001 B1
(45) Date of Patent: Jun. 11, 2002

(54) PRODUCTION OF POWDER-MOLDED BODY

(75) Inventor: Shinzo Hayashi, Obu (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 09/812,546

(22) Filed: Mar. 20, 2001

(30) Foreign Application Priority Data

Mar. 22, 2000 (JP) .......................................... 2000-080538
Feb. 21, 2001 (JP) .......................................... 2001-044500

(51) Int. Cl.$^7$ ................................................. B28B 1/14
(52) U.S. Cl. ........................ 264/109; 264/122; 264/621; 264/669; 264/670; 264/263
(58) Field of Search ................................. 264/621, 669, 264/670, 122, 109, 263

(56) References Cited

U.S. PATENT DOCUMENTS 4,976,706 A * 12/1990 Aki et al. .................... 604/304
5,028,362 A    7/1991 Janney et al.
5,746,957 A * 5/1998 Fanelli et al. ................ 264/109
6,045,758 A    4/2000 Hayashi

FOREIGN PATENT DOCUMENTS

| JP | 5-178652 | 7/1993 |
| JP | 7-22931 | 3/1995 |
| JP | 11-171651 | 6/1999 |

* cited by examiner

Primary Examiner—Christopher A. Fiorilla
(74) Attorney, Agent, or Firm—Burr & Brown

(57) ABSTRACT

A method for producing a powder-molded body is provided, including the steps of casting a slurry containing a powder of at least one of a ceramic and a metal, and organic dispersion medium, and a gelling agent into a mold, and solidifying the slurry by gelling the slurry to obtain a molded body. The slurry is solidified by chemically bonding an organic dispersion medium having reactive functional groups and a gelling agent. The method is capable of improving gelling (solidification) efficiency and obtaining a molded body having a high density, a small firing shrinkage, and high shape precision, and which hardly experiences cracks during drying and firing.

8 Claims, 1 Drawing Sheet

PRODUCTION OF POWDER-MOLDED BODY

BACKGROUND OF THE INVENTION AND RELATED ART STATEMENT

The present invention relates to a method for producing a molded body of a powder of a ceramic and/or a metal, and more particularly a method for producing a powder-molded body obtained by casting a gelling agent-containing slurry and solidifying the slurry by gelling the slurry (so-called a gel-cast molding method).

Conventionally, methods such as press molding, cast molding, an injection molding, and the like have been employed as methods for producing a molded body of a powder of a ceramic and a metal and these methods respectively have problems that it is difficult to form a product with a complicated shape, that the size precision is low, that cracking easily takes place in the case of a thick product, that the density of a molded body is hardly increased, and the like and thus the methods are not necessarily satisfactory.

Therefore, attention has recently been paid to a gel-cast molding method (hereinafter referred simply as to a gel-cast method) as a method for solving these problems.

The gel-cast method is a production method of a powder-molded body for obtaining a molded body by casting a slurry containing a powder of a ceramic and/or a metal, a dispersion medium, and a gelling agent and solidifying the slurry by gelling the slurry by controlling the temperature conditions, adding a cross-linking agent, and the like. The gel-cast method is characterized in that a product with a complicated shape can easily be formed since a slurry can be poured in a form in a highly fluid state before gelling and additionally characterized in that a molded body with a sufficiently high strength to stand handling can be obtained by gelling the slurry after casting.

Practically, a method comprising the steps of producing a slurry by dispersing a prepolymer as a gelling agent such as a poly(vinyl alcohol), an epoxy resin, a phenol resin, and the like together with a powder of a ceramic or a metal in a dispersion medium, casting the slurry, and then gelling the slurry by three-dimensionally cross-linking the gelling agent by a cross-linking agent and the like are employed for solidification of a slurry.

However, the above described conventional gel-cast method has the following problems.

At first, the workability of the casting is not necessarily satisfactory to the present requirement and there exist serious problems that cracks are formed at the time of drying the molded body and that significant deformation takes place following insufficient sintering and increase of shrinkage percentage at the time of sintering the molded body.

That is, in the case of a conventional method, because the prepolymer exists in a non-reactive dispersion medium while being diluted and therefore the prepolymer is required to be added in a large amount together with a large amount of cross-linking agent in order to be cross-linked, which inevitably increases the viscosity of the slurry, or because the slurry contains large amounts of the non-reactive dispersion medium, the prepolymer, and the cross-linking agent and it results in existence of large amounts of components, other than the powder, to be evaporated and fired out by drying and firing in the molded body to be subjected to drying and firing.

Secondary, there exists a problem that cracks are formed attributed to unevenness of the shrinkage percentage in respective parts of a molded body at the time of drying and firing.

That is because it is difficult to evenly disperse both of the gelling agent and the cross-linking agent in a slurry with a high concentration and therefore the entire slurry cannot evenly be solidified to result in uneven hardness.

Thirdly, in the case of high viscosity of the prepolymer itself, there exists a problem that since a highly fluidic slurry cannot be produced, the density of the molded body is lowered.

Such a decrease of the density of the molded body results in increase of drying shrinkage and firing shrinkage to make it easy to cause cracks at the time of drying and firing the molded body and consequently leads to decrease of the shape precision of a sintered body.

On the other hand, although a method of using a prepolymer with a low molecular weight and a low viscosity can be considered there exists a problem that a slurry cannot sufficiently be solidified in the case of using a prepolymer with a low molecular weight.

SUMMARY OF THE INVENTION

The present invention has been achieved while these problems in conventional techniques being taken into consideration, and an object of the present invention is to provide a production method of powder-molded body capable of improving the gelling (solidification) efficiency and obtaining a molded body with a high density, a low firing shrinkage, and a high shape precision while scarcely causing cracks at the time of drying and firing.

The inventors of the present invention have found that the above described problems on the conventional techniques can be solved by solidifying the gelling agent with the dispersion medium but not with a cross-linking agent by chemically bonding them and have achieved the present invention.

The present invention provides a method for producing a powder-molded body, comprising: casting a slurry containing a powder of a ceramic and/or a metal, a dispersion medium, and a gelling agent; and solidifying the slurry by gelling the slurry to obtain a molded body, wherein the slurry is solidified by chemically bonding an organic dispersion medium having reactive functional groups and the gelling agent.

In the production method of the present invention, it is preferable to use an organic dispersion medium having two or more reactive functional groups and it is preferable to use an organic dispersion medium having reactive functional groups in 60% by mass or more in the total dispersion medium.

In the production method of the present invention, it is preferable for the organic dispersion medium having reactive functional groups to have viscosity of 20 cps or lower at 20° C. and it is preferable for the gelling agent to have viscosity of 3,000 cps or lower at 20° C. More particularly, it is preferable to solidify a slurry containing an organic dispersion medium having two ore more ester bonds and a gelling agent having isocyanate group and/or isothiocyanate group by chemically bonding the organic dispersion medium and the gelling agent. Further in this case, it is preferable that MDI (4,4'-diphenylmethane diisocyanate) type isocyanate or HDI (hexamethylene diisocyanate) type isocyanate respectively having a basic chemical structure defined as the following chemical formula (1) or (2) is used as the gelling agent and MDI (4,4'-diphenylmethane diisocyanate) type isocyanate having a basic chemical structure defined as the following chemical formula (1) is furthermore preferable to be used as the gelling agent.

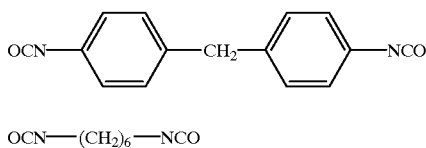

(1)

OCN—(CH₂)₆—NCO (2)

DETAILED DESCRIPTION OF PREFERRED EMBODIMENT

Figure 1:
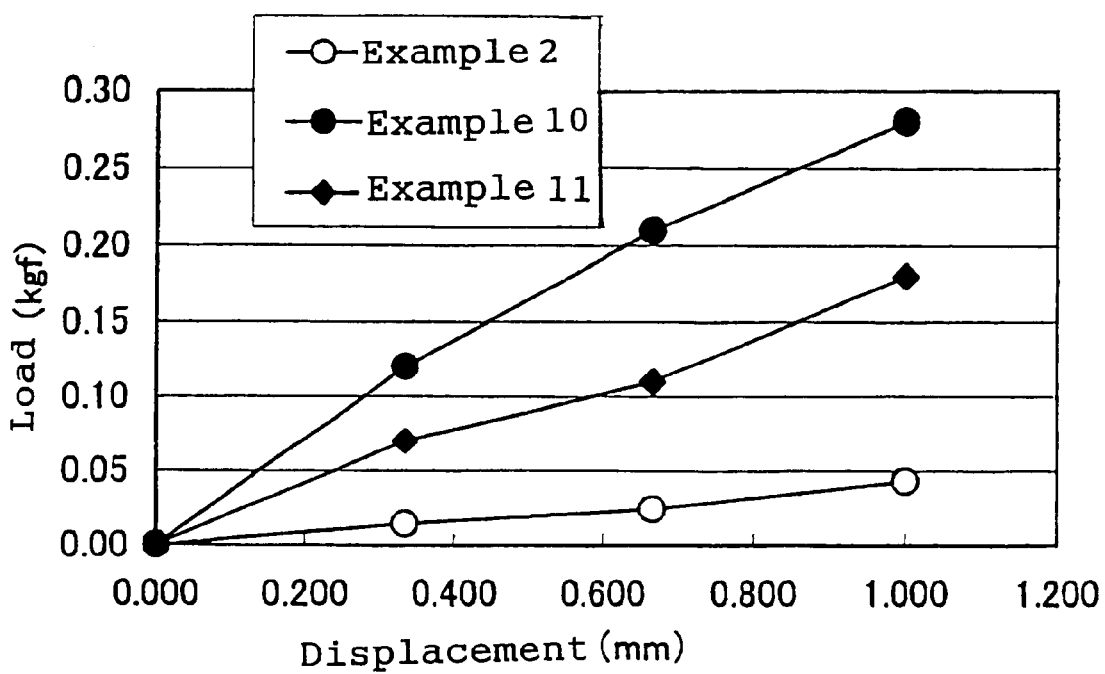
FIG. 1 is a graph showing the correlations between the displacement and the load regarding the formed bodies obtained in examples 2, 10, 11 of the present invention.

The production method of powder-molded body according to the present invention relates to a so-called gel-cast method characterized by solidifying a slurry by chemically bonding a gelling agent and a dispersion medium. By such a method, the gelling efficiency (solidification) can be improved and a formed product with a high density, a small firing shrinkage, and a high shape precision can be obtained scarcely being accompanied with cracking at the time of drying and firing.

Hereinafter, the production method of the present invention will be described in details.

The most characteristic feature of the production method of the present invention is that a slurry can sufficiently be solidified by a small amount of a gelling agent. That is, in the production method of the present invention, since the gelling agent is in a state that the agent is constantly brought into contact with and ready to be reacted with the dispersion medium, which is an object to be reacted with, the solidification efficiency is high, and even if the gelling agent is small in the amount, sufficient solidification is possible.

On the other hand, in a method for reacting a gelling agent with a cross-linking agent, the gelling agent and the cross-linking agent are diluted with a dispersion medium and reaction takes place only in the case the gelling agent and the cross-linking agent are brought into contact with each other in the dispersion medium, so that much amounts of the gelling agent and the cross-linking agent have nothing to be with the solidification and the solidification efficiency is low.

1. Organic Dispersion Medium

An organic dispersion medium of the present invention has to satisfy the following two requirements: (a) to be a liquid substance capable of forming chemical bonds with a gelling agent and solidifying a slurry and (b) to be a liquid substance with which a slurry with high fluidity and easy to be poured can be produced.

In order to form chemical bonds with a gelling agent and to solidify a slurry, it is required for the organic dispersion medium to have reactive functional groups, that is, hydroxyl group, carboxyl group, and amino group, capable of forming chemical bonds with a gelling agent in a molecule (hereinafter such an organic dispersion medium is referred as to a reactive dispersion medium.).

Although it is sufficient for the reactive dispersion medium to have at least one reactive functional group, it is preferable to use an organic dispersion medium having two or more reactive functional groups in order to obtain further sufficient solidification state.

For example, polyalcohols (e.g. diols such as ethylene glycol, triols such as glycerin), polybasic acids (e.g. dicarboxylic acids) are supposedly among the substances as a liquid substance having two or more reactive functional groups.

Incidentally, it is not necessary for the reactive functional groups in a molecule to be the same type of functional groups and may be dissimilar functional groups. Additionally, the reactive functional groups may exist many just like polyethylene glycol.

On the other hand, in order to produce a slurry with a high fluidity and easy to be poured in a form, it is preferable to use a liquid substance with viscosity as low as possible and particularly preferable to use a substance with a viscosity of 20 cps or lower at 20° C.

Since the foregoing polyalcohols and polybasic acids sometimes have high viscosity by formation of a hydrogen bond, in some cases, those substances are not preferable as the reactive dispersion medium even if they are possible to solidify a slurry.

Consequently, in the present invention, esters having two or more ester bonds, such as polybasic acid esters (for example, dimethyl glutarate and the like) and polyalcohol acid esters (for example, triacetin and the like) are preferably used as a reactive dispersion medium.

That is because, although they are relatively stable, esters are sufficiently reactive with a gelling agent with high reactivity and have low viscosity and thus satisfy the above described two requirements. Especially, esters with 20 or less carbons in total have low viscosity, they are preferably used as the reactive dispersion medium.

In the present invention, the entire dispersion medium is not necessary to be the above described reactive dispersion medium and the reactive dispersion medium may be used together with other dispersion media.

Ethers, hydrocarbons, toluene, and the like are, for example, preferable as a non-reactive dispersion medium. These non-reactive dispersion media are properly selected depending on the chemical properties such as compatibility with a reactive dispersion medium to be used together and with a dispersion medium and, for example, in the case of using esters as a reactive dispersion medium, ethers preferable from a viewpoint of compatibility.

Incidentally, as a non-reactive dispersion medium, water which is widely used as a dispersion medium for a slurry can be used, however it is preferable to suppress the addition amount of water as low as possible since a molded body becomes difficult to be dried and in the case of using an isocyanate as a gelling agent, carbon dioxide gas is generated by a reaction and foams are formed in a resultant molding to result in a decrease of the density and the strength of the molded body (the sintered body) and easy crack formation in the molded body (the sintered body).

Further, as a non-reactive dispersion medium, even in the case of using an organic compound, from a viewpoint of retaining efficiency of a reaction with a gelling agent, a reactive dispersion medium to be added preferably takes 60% by mass or more in the total amount of the dispersion media and more preferably for 85% by mass or more.

2. Gelling Agent

A gelling agent to be used in the present invention is a substance capable of solidifying a slurry by forming chemical bonds with a dispersion medium. Consequently, a substance having a reactive functional group capable of chemically reacting with the dispersion medium in a molecule may be used as the gelling agent in the present invention and the substance may be any of a monomer, an oligomer, and a prepolymer (for example, poly(vinyl alcohol), an epoxy resin, a phenol resin, and the like) capable of three-dimensionally cross-linking by addition of, for example, a cross-linking agent.

Incidentally, it is preferable to use a substance with a low viscosity, more particularly with a viscosity of 3000 cps or lower at 20° C., as the gelling agent in the present invention from a viewpoint of retaining fluidity of a slurry.

Since a prepolymer and a polymer with high average molecular weights (based on GPC method) generally have a high viscosity, in the present invention, a monomer and an oligomer with smaller molecular weights than those of the prepolymer and the polymer, more particularly 2000 or lower, are preferable to be used.

Incidentally, the term, viscosity, means the viscosity of a gelling agent itself (the viscosity of 100% gelling agent) but not the viscosity of a sold diluted gelling agent solution (for example, an aqueous solution of a gelling agent).

It is preferable to properly select the reactive functional groups of a gelling agent of the present invention in consideration of the reactivity with a reactive dispersion medium. For example, in the case of using esters with relatively low reactivity as a reactive dispersion medium, it is preferable to select a gelling agent having isocyanate group (—N=C=O) and/or isothiocyanate group (—N=C=S) with high reactivity.

Although isocyanates are generally reacted with diols and diamines, many diols have high viscosity and diamines have too high reactivity, as described above, so that a slurry is sometimes solidified before casting.

Taking such a matter into consideration, a slurry is preferable to be solidified by reaction of a reactive dispersion medium having ester bonds and a gelling agent having isocyanate group and/or an isothiocyanate group, and in order to obtain a further sufficient solidified state, a slurry is more preferable to be solidified by reaction of a reactive dispersion medium having two or more ester bonds and a gelling agent having isocyanate group and/or an isothiocyanate group.

Examples of the gelling agent having isocyanate group and/or isothiocyanate group are MDI (4,4'-diphenylmethane diisocyanate) type isocyanate (resin) having a basic chemical structure defined as the following chemical formula (1), HDI (hexamethylene diisocyanate) type isocyanate (resin) having a basic chemical structure defined as the following chemical formula (2), TDI (tolylene diisocyanate) type isocyanate (resin) having a basic chemical structure defined as the following chemical formula (3), IPDI (isophorone diisocyanate) type isocyanate (resin) having a basic chemical structure defined as the following chemical formula (4), and an isothiocyanate (resin) having a basic chemical structure defined as the following chemical formula (5).

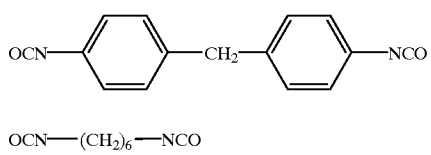

(1)

OCN—(CH$_2$)$_6$—NCO (2)

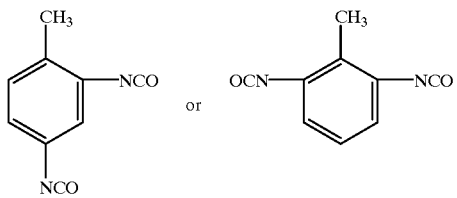

(3)

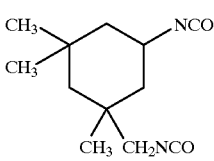

(4)

R—N=C=S (5)

A dimmer and a trimmer having the following general formulas (6) to (8) are examples of the HDI (hexamethylene diisocyanate) type isocyanate (resin) having a basic chemical structure defined as the above described chemical formula (2).

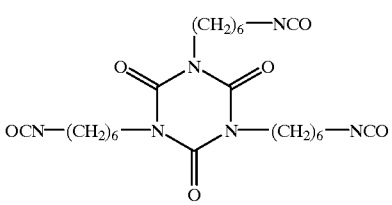

(6)

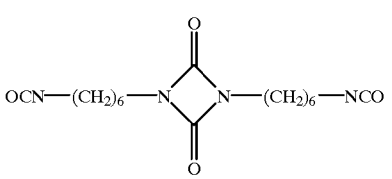

(7)

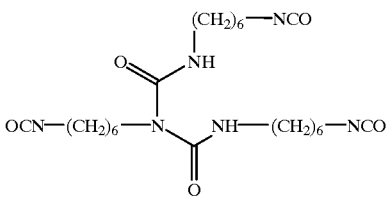

(8)

In the present invention, among them, preferable ones are MDI (4,4'-diphenylmethane diisocyanate) type isocyanate (resin) and HDI (hexamethylene diisocyanate) type isocyanate (resin) and more preferable one is MDI (4,4'-diphenylmethane diisocyanate) type isocyanate (resin).

That is because, in the case of using those isocyanates (resins), especially MDI (4,4'-diphenylmethane diisocyanate) type isocyanate (resin), as a gelling agent, it brings the following advantages: (1) the hardness of the molded body is increased to suppress the occurrence of cracking even if the molded body has a thin structure; (2) the shrinkage is remarkably decreased at the time of drying to suppress the occurrence of cracking and the deformation at the time of drying; and (3) the solidification speed is increased to elevate the speed of the molded body process.

Additionally, in the present invention, other functional groups may preferably be introduced into the foregoing basic chemical structures while taking the chemical characteristics such as compatibility with the reactive dispersion medium and the like into consideration and for example, in the case of reaction with a reactive dispersion medium having ester bonds, it is preferable to introduce a hydrophilic functional group from a viewpoint of improvement of evenness at the time of mixing by increasing the compatibility with esters.

Further, in the present invention, reactive functional groups other than isocyanate group or isothiocyanate group may be introduced into a molecule and isocyanate group and isothiocyanate group may coexist. Furthermore, as a polyisocyanate, a large number of reactive functional groups may exist together.

3. Powder

The material of a powder to be employed for the present invention is not particularly limited as long as the material is a ceramic and/or a metal and a variety of ceramic powders such as glass, alumina, silicon nitride, silicon carbide, aluminum nitride, zirconia, sialon, and the like and metal powders can be employed. Incidentally, these ceramic powders and a variety of metal powders can properly be used either solely or in combination of two or more of them. The particle diameters of the powders are not particularly limited as long as a slurry can be produced using the powders.

4. Slurry for Molding

A slurry for molding of the present invention may be produced by either (1) producing a slurry by dispersing a powder in a dispersion medium and then adding a gelling agent or (2) simultaneously adding and dispersing a powder and a gelling agent to and in a dispersion medium.

In consideration of the workability during casting, the viscosity of the slurry at 20° C. is preferable 20,000 cps or lower. The viscosity of the slurry can be adjusted also by the types of powders, the amount of a dispersion medium, the concentration of the slurry (% by volume of the powders to the entire volume of the slurry) other than the viscosity of the reactive dispersion medium and the gelling agent.

However, if the slurry concentration is too low, it is undesirable since it results in problems that the strength of a molded body is decreased and that cracks are formed at the time of drying and firing and deformation is caused by increase of shrinkage percentage. Consequently, in general, the slurry is preferable to have a concentration of 25 to 75% by volume, and in terms of suppressing cracks formed by drying and shrinking, the slurry is further preferable to have a concentration of 35 to 75% by volume.

Incidentally, unless they inhibit the effects of the present invention, a variety of additives described below may be added to the slurry for molding; for example, a catalyst for promoting the reaction of the dispersion medium and the gelling agent, a dispersing agent, a defoaming agent and a surfactant for making the slurry production easy and a sintering aid and the like for improving the characteristics of a sintered body.

5. Gelling

The present invention is to provide a molded body by casting the above described slurry into a molded body die with a desired shape and then solidifying the slurry by gelling the slurry.

In the present invention, the slurry before casting has a low viscosity and a high fluidity and on the other hand, the molded body after the solidification is required to have a sufficient strength to stand handling. Consequently, it is preferable to use a dispersing agent of such as polycarboxylic acid esters and the like to produce a slurry with a low viscosity and a high fluidity.

Further it is preferable to properly select (a) the reaction temperature, (b) the type and the content of a reactive dispersion medium, (c) the type and the content of a gelling agent, and (d) the type and the content of a catalyst for the gelling reaction to produce the slurry which is not solidified at the time of casting and it is preferable to carry out gelling by properly selecting solely a method or methods in combination from 1) by keeping still for a prescribed period, 2) by increasing the temperature to a reaction temperature, and 3) by adding a catalyst immediate before the casting.

Since gelling of the slurry is carried out by chemically bonding the reactive dispersion medium and the gelling agent, being different from a conventional gel-cast method in which gelling of a slurry is carried out by reaction of a gelling agent and a cross-linking agent in a dispersion medium, the present invention has the following advantages.

At first, since a large amount of the dispersion medium itself exists in the slurry is reacted with the gelling agent, the gelling (the solidification) efficiency can be increased. That is, even if the addition amount of the gelling agent is small, the slurry can sufficiently be solidified and the drying shrinkage and firing shrinkage is low to obtain a sintered body with a high density and a high strength without molding cracks at the time of the drying and the firing.

Secondary, the present invention does not require to add a cross-linking agent additionally, a molded body with uniform characteristics such as solidified hardness of respective parts can be obtained if the gelling agent is evenly dispersed.

Thirdly, since the slurry can sufficiently be solidified by the present invention without using a prepolymer with a high molecular weight and a high viscosity as a gelling agent, the slurry with a low viscosity and a high fluidity can be produced. Consequently, a molded body with high shape precision can be obtained and even a product with a complicated shape can be formed.

EXAMPLES

Hereinafter, a production method of powder-molded body according to the present invention will be described further in details with reference to examples. However, the present invention is not at all limited to these examples.

1. Production of a Molded Body

A slurry for molding was produced by adding and mixing a dispersing agent to and in a dispersion medium in a room temperature (about 20° C.) and then adding and dispersing a powder to and in the obtained dispersion medium to obtain a slurry and further adding and dispersing a gelling agent to and in the slurry and after that, adding a reaction catalyst to the resultant slurry.

The produced slurry for molding was poured in a mold and then kept still for a prescribed period and solidified by gelling to obtain a molded body. The molded body was a body formed by casting to a polymer beaker of 300 cc capacity and had a disk-like shape of $\phi$60 mm×30 mm thick size. Next, the molded body was dried, debinded and fired in the atmosphere of air or an inert gas atmosphere depending on the types of powders to obtain a sintered body.

In respective examples and respective comparative examples, slurries used had the compositions described in Table 1 and Table 2.

Hereinafter, the respective compositions (powders, dispersion media, gelling agents, dispersing agents, reaction catalysts, and cross-linking agents) of the slurries described in Table 1 and Table 2 will be described in details.

(1) Powder

Powders used were properly selected from a glass powder, alumina, silicon nitride, zirconia, and aluminum nitride.

Incidentally, silicon nitride and aluminum nitride used respectively for the example 3 and the example 5 contain prescribed amounts of sintering aids.

(2) Dispersion Medium

Either a mixture of triacene and dimethyl glutarate in 10:90 mass ratio (herein after referred as to ester; the viscosity (at 20° C.)=1.5 cps) or ethylene glycol (the viscosity (at 20° C.)=24 cps) was selected to be used as the reactive dispersion medium. Further, either water (the viscosity (at 20° C.)=1 cps) or toluene (the viscosity (at 20° C.)=0.6 cps) was properly selected to be used as a non-reactive reactive dispersion medium.

(3) Gelling Agent

The following compounds were properly selected to be used. Further, in the case of using the following modified HDI (hexamethylene diisocyanate) type substance and modified MDI (4,4'-diphenylmethane diisocyanate) type substance, triethylamine was used based on necessity as a reaction catalyst:

(i) HDI (hexamethylene diisocyanate) urethodione: hexamethylene diisocyanate dimmer (the viscosity at 200° C.=170 cps) (hereinafter referred as to modified HDI substance);

(ii) modified MDI (4,4'-diphenylmethane diisocyanate) substance: modified 4,4'-diphenylmethane diisocyanate, trade name: SBU 0775 (produced by Sumitomo Bayer Urethane Co., Ltd.) (hereinafter referred as to modified MDI substance);

(iii) isobutylene-maleic acid anhydride copolymer A: trade name: Isobam 110 (produced by Kuraray Co., Ltd., a solid at a room temperature) (hereinafter referred as to prepolymer A); and (iv) isobutylene-maleic acid anhydride copolymer B: trade name: Isobam 600 (produced by Kuraray Co., Ltd., a solid at a room temperature) (hereinafter referred as to prepolymer B).

(4) Cross-linking Agent

In the case of using modified HDI substance as a gelling agent, a polyester polyol (hereinafter referred as to a cross-linking agent A) was used based on necessity and in the case of using the prepolymers A, B as gelling agents, a solidifying agent C (produced by Kuraray Co., Ltd.; hereinafter referred as to cross-linking agent B) was used.

(5) Dispersing Agent

The following compounds were properly selected to be used:

(i) polymaleic acid copolymer A: trade name Flowlen G 700 (produced by Kyoeisha Chemical Co., Ltd.) (hereinafter referred as to dispersing agent A);

(ii) polymaleic acid copolymer B: trade name Malialim (produced by Nippon Oil & Fats Co., Ltd.) (hereinafter referred as to dispersing agent C); and (iii) Ammonium polycarboxylate: trade name A-6114 (produced by Toagosei Co., Ltd.) (hereinafter referred as to dispersing agent B).

2. Evaluation Method

Regarding the respective examples and comparative examples, evaluation was carried out by measuring the slurry concentration, the fluidity of a slurry, the solidified state of a slurry, the state after drying, the density of a sintered body, the strength of a sintered body, and the hardness by the following methods. The results are shown in Tables 1 to 4 and FIG. 1.

(1) Concentration of slurry: calculated by volume ratio of a powder in the entire volume of a slurry.

(2) Fluidity of slurry: evaluated by viscosity of a slurry at a room temperature (20° C.). The viscosity was measured by a rotation type viscometer.

The viscosities of the dispersing agent and the gelling agent were measured by the same method.

(3) Solidified state of slurry: evaluated by eye observation and handling property. That is, the term, "good," was assigned to those with even quality based on eye observation and possible to be carried; the term, "insufficiently solidified," to those which were not deformed by inclination but broken in forms only by pushing with finger tips; and the term, "not solidified," to those which were as in slurry state.

(4) State after drying: evaluated by existence or absence of cracks and deformation in a molded body after drying. In this case, the term, "good, " was assigned to those completely free of cracks; the term, "fine cracking," to those in which linear cracks were observed although they kept the shapes at the time of molding; and the term, "cracking," to those in which opened cracks were observed.

(5) Density of sintered body: measured by Archimedes' method in water.

(6) Strength of sintered body: evaluated by four-point bending strength of a sintered body cut into height 3 mm×width 4 mm×thickness 40 mm size. The four-point bending strength was measured according to the four-point bending method described in JIS 1601.

(7) Strength of molded body: evaluated as hardness by measuring hardness by three-point bending in conditions of 40 mm span and 2 mm/min displacement speed using a specimen of a rod of $\phi 1$.

(8) Form precision of molded body: evaluated by measuring the outer diameter and the out of roundness. In this case, the outer diameter and the out of roundness were measured by measuring outer diameter at positions 10 mm apart from the respective upper and lower end face and the center using a laser length measuring apparatus. In the circumferential direction, measurement was carried out at 8 points at every 22.5 degree and, the average value roundness was defined as an outer diameter and the difference between the maximum value and the minimum value was defined as roundness.

(9) Hardness: evaluated as the degree of the displacement at the time when load was changed in a three-point bending test using a specimen of a rod of $\phi 8$ of each molded body obtained by the respective examples and comparative examples.

TABLE 1

| | Examples | | | | | |
|---|---|---|---|---|---|---|
| | 1 | 2 | 3 | 4 | 5 | 6 |
| Powder type | glass powder | alumina | silicon nitride | zirconia | aluminum nitride | alumina |
| Powder amount (g) | 1000.0 | 1000.0 | 1000.0 | 1000.0 | 1000.0 | 1000.0 |

TABLE 1-continued

| | | | | | | |
|---|---|---|---|---|---|---|
| Dispersion medium type (mass ratio) | ester | ester | ester | ester | ester | ethylene glycol |
| Dispersion medium amount (g) | 150.0 | 240.0 | 350.0 | 365.0 | 445.0 | 240.0 |
| Gelling agent type | modified HDI | modified HDI | modified HDI | modified HDI | modified HDI | modified HDI |
| Gelling agent amount (g) | 12.0 | 19.2 | 28.0 | 29.2 | 35.6 | 19.2 |
| Cross-linking agent type | — | — | — | - | — | — |
| Cross-linking agent amount (g) | — | — | — | — | — | — |
| Reaction catalyst type | triethylamine | triethylamine | triethylamine | triethylamine | triethylamine | triethylamine |
| Reaction catalyst amount (g) | 1.5 | 2.4 | 3.5 | 3.7 | 4.5 | 2.4 |
| Dispersing agent type | dispersing agent A | dispersing agent A | dispersing agent A | dispersing agent A | dispersing agent A | dispersing agent A |
| Dispersing agent amount (g) | 11.3 | 18.0 | 26.3 | 27.4 | 33.4 | 18.0 |
| Solidification conditions | a room temp., 6h | a room temp., 6h | a room temp., 6h | a room temp., 6h | a room temp., 6h | a room temp., 6h |
| Slurry concentration (vol. %) | 67.8 | 47.8 | 42.5 | 28.7 | 38.2 | 47.8 |
| Slurry fluidity (cps) | 9000.0 | 700.0 | 3500.0 | 750.0 | 580.0 | 20000.0 |
| Solidification state | good | good | good | good | good | good |
| State after drying | good | good | good | finely cracking | good | good |
| Sintered body density (g/cm$^3$) | 2.6 | 3.9 | 3.2 | 6.0 | 3.2 | 3.9 |
| Sintered body strength (MPa) | — | 420 | — | — | — | — |

| | Examples | | |
|---|---|---|---|
| | 7 | 8 | 9 |
| Powder type | alumina | zirconia | zirconia |
| Powder amount (g) | 1000.0 | 1000.0 | 1000.0 |
| Dispersion medium type (mass ratio) | ester | ester/ether (85:15) | ester/ether (60:40) |
| Dispersion medium amount (g) | 240.0 | 365 0 | 365 0 |
| Gelling agent type | modified HDI | modified HDI | modified HDI |
| Gelling agent amount (g) | 19.2 | 29.2 | 29.2 |
| Cross-linking agent type | — | — | — |
| Cross-linking agent amount (g) | — | — | — |
| Reaction catalyst type | — | triethylamine | triethylamine |
| Reaction catalyst amount (g) | — | 3.7 | 3.7 |
| Dispersing agent type | dispersing agent A | dispersing agent A | dispersing agent A |
| Dispersing agent amount (g) | 18.0 | 27.4 | 27.4 |
| Solidification conditions | 80° C., 5 min | a room temp., 6h | a room temp., 6h |
| Slurry concentration (vol. %) | 47.8 | 27.7 | 26.8 |
| Slurry fluidity (cps) | 700.0 | 700.0 | 600.0 |
| Solidification state | good | good | good |
| State after drying | good | good | finely cracking |
| Sintered body density (g/cm$^3$) | 3.9 | 6.0 | 6.0 |
| Sintered body strength (MPa) | 410 | — | — |

TABLE 2

| | Comparative Example | | | | | | |
|---|---|---|---|---|---|---|---|
| | 1 | 2 | 3 | 4 | 5 | 6 | 7 |
| Powder type | alumina | alumina | silicon nitride | zirconia | aluminum nitride | alumina | alumina |
| Powder amount (g) | 1000.0 | 1000.0 | 1000.0 | 1000.0 | 1000.0 | 1000.0 | 1000.0 |
| Dispersion medium type (mass ratio) | water | toluene | toluene | toluene | water | water | water |
| Dispersion medium amount (g) | 240.0 | 240.0 | 200.0 | 160.0 | 240.0 | 300.0 | 240.0 |
| Gelling agent type | modified HDI | modified HDI | modified HDI | modified HDI | prepolymer A | prepolymer A | prepolymer B |
| Gelling agent amount (g) | 24.0 | 24.0 | 12.0 | 24.0 | 40.0 | 40.0 | 40.0 |
| Cross-linking agent type | — | — | cross-linking agent A | cross-linking agent A | cross-linking agent B | cross-linking agent B | cross-linking agent B |
| Cross-linking agent amount (g) | — | — | 48.0 | 96.0 | 2.0 | 2.0 | 2.0 |
| Reaction catalyst type | triethylamine | triethylamine | triethylamine | triethylamine | — | — | — |
| Reaction catalyst amount (g) | 1.5 | 1.5 | 1.5 | 1.5 | — | — | — |
| Dispersing agent type | dispersing agent B | dispersing agent B | dispersing agent C | dispersing agent C | dispersing agent C | dispersing agent C | dispersing agent C |
| Dispersing agent amount (g) | 2.0 | 4.0 | 4.0 | 4.0 | 2.0 | 2.0 | 2.0 |
| Solidification conditions | a room temp., 6h | a room temp., 6h | a room temp., 6h | a room temp., 6h | 80° C., 4h | 80° C., 4h | 80° C., 4h |
| Slurry concentration (vol. %) | 47.5 | 42.2 | 42.7 | 43.5 | 45.5 | 35.6 | 45.5 |
| Slurry fluidity (cps) | 600 | 800 | 3000 | 5000 | no fluidity | 20000 | 15000 |
| Solidification state | good | not solidified | not solidified | insufficiently solidified | — | insufficiently solidified | not solidified |
| State after drying | good | — | — | cracking | — | significant deformation | — |
| Sintered body density (g/cm³) | 3.7 | — | — | 3.9 | — | 3.9 | — |
| Sintered body strength (Mpa) | 250 | — | — | cracking | — | cracking | — |

TABLE 3

| | Examples | | | | |
|---|---|---|---|---|---|
| | 10 | 11 | 12 | 13 | 14 |
| Powder type | alumina | alumina | alumina | alumina | silicon nitride |
| Powder amount (g) | 1000.0 | 1000.0 | 1000.0 | 1000.0 | 1000.0 |
| Dispersion medium type (mass ratio) | ester | ester | ester | ester | ester |
| Dispersion medium amount (g) | 240.0 | 240.0 | 240.0 | 240.0 | 350.0 |
| Gelling agent type | modified MDI | modified MDI | modified MDI | modified MDI | modified MDI |
| Gelling agent amount (g) | 19.2 | 9.6 | 19.2 | 19.2 | 14.0 |
| Cross-linking agent type | — | — | — | — | — |
| Cross-linking agent amount (g) | — | — | — | — | — |
| Reaction catalyst type | — | — | — | triethylamine | — |
| Reaction catalyst amount (g) | — | — | — | 1.0 | — |
| Dispersing agent type | dispersing agent A | dispersing agent A | dispersing agent A | dispersing agent A | dispersing agent A |
| Dispersing agent amount (g) | 18.0 | 18.0 | 18.0 | 18.0 | 26.3 |
| Solidification conditions | a room temp., 10 min. | a room temp., 15 min. | 0° C., 2h | 0° C., 15 min. | a room temp., 1h |
| Volume ratio of powder (vol. %) | 48.0 | 48.7 | 47.8 | 47.8 | 42.7 |
| Slurry fluidity (cps) | 700.0 | 700.0 | 700.0 | 700.0 | 3500.0 |
| Solidification state | good | good | good | good | good |

TABLE 3-continued

|  | Examples | | | | |
| --- | --- | --- | --- | --- | --- |
|  | 10 | 11 | 12 | 13 | 14 |
| State after drying | good | good | good | good | good |
| Shrinkage percentage at the time of drying (%) | 0.3 | 0.5 | 0.3 | 0.3 | 0.2 |
| Sintered body densiiy (g/cm$^3$) | 3.9 | 3.9 | 3.9 | 3.9 | 3.2 |
| Sintered body strength (MPa) | — | — | — | — | — |

TABLE 4

|  | Example 15 | Example 16 |
| --- | --- | --- |
| Production conditions/solidification conditions | same as example 2 | same as example 10 |
| Solidification hardness | Refer to FIG. 1 | Refer to FIG. 1 |
| Number of dried body defects | 1/5 | 0/5 |
| Outer diameter after drying (upper part) mm | 93.53 | 99.63 |
| Out of roundness after drying (upper part) mm | 0.35 | 0.05 |
| Outer diameter after drying (middle part) mm | 93.45 | 99.68 |
| Out of roundness after drying (middle part) mm | 0.22 | 0.03 |
| Outer diameter after drying (lower part) mm | 93.72 | 99.7 |
| Out of roundness after drying (lower part) mm | 0.27 | 0.02 |

3. Examples and Comparative Examples

Examples 1 to 5

Molded bodies in a disk-like shape were produced from a variety of ceramic powders using an ester as a reactive dispersion medium and the modified HDI substance as a gelling agent. As a result, regarding any ceramic powder, the fluidity of the slurries and solidification state of molded bodies were good.

Further in the case of the examples 1 to 3 and the example 5, no crack was formed at the time of drying and at the time of firing. That is, molded bodies (sintered bodies) with high shape precision were obtained. Further, these sintered bodies had a high density.

In the case of the example 4 where the slurry concentration was low, although fine cracks were formed at the time of drying, and after that, no crack was generated at the time of firing. Further, the fine cracks formed at the time of drying were supposed to be in a range of possibility of avoiding the formation by changing the drying conditions and at the same time depending on the product shape, the cracks were supposed to be within an allowable level to apply the molded body for practical use.

Example 6

A molded body was produced in the same conditions as those of the example 2 except that the reactive dispersion medium used in the example 2 was changed to ethylene glycol, which is a diol. As a result, the viscosity of the slurry was increased and the fluidity was slightly decreased attributed to the high viscosity of the dispersion medium.

The molded body was excellent in the solidification state although the casting became difficult as compared with the examples 1 to 5 and a sintered body with a high density was obtained by firing the molded body.

Example 7

A molded body was produced in the same conditions as those of the example 2 except that gelling was carried out by heating to 80° C. without adding a reaction catalyst in the example 2. As a result, the slurry was quickly solidified in 5 minutes and a sintered body with a high density and a high strength as same as that of the example 2 was obtained by firing the molded body.

Examples 8, 9

Molded bodies were produced in the same conditions as those of the example 4 except that the dispersion medium used in the example 4 was changed to a mixture of an ester and diethyl ether in 85:15 mass ratio (example 8) and in 60:40 mass ratio (example 9), respectively.

As a result, the viscosity of each slurry and the density of each sintered body were good and although the hardness was slightly increased as compared with that of the example 4, the solidification state of each molded body was good. Further, in the case of the example 8, no crack was formed at the time of drying and at the time of firing and a molded body (a sintered body) with a high shape precision was obtained.

In the case of example 9 also, fine cracks were formed at the time of drying as same as in the case of the example 4, and after that no crack was generated at the time of firing and a sintered body with a high density was obtained. Further, the fine cracks formed at the time of drying were supposed to be in a range of possibility of avoiding the formation by changing the drying conditions and at the same time depending on the product shape, the cracks were supposed to be within an allowable level to apply the molded body for practical use.

Examples 10, 11

Molded bodies were produced in the same conditions as those of the example 2 except that the gelling agent used in the example 2 was changed to a modified MDI substance (in the case of example 11, the addition amount of the modified MDI substance was controlled to be a half of that of example 10) and except that no catalyst was used. As a result, the separation was possible in 10 minutes after casting in the case of the example 10 and the separation was possible in 15 minutes after casting in the case of the example 11.

The hardnesses of the respective molded body obtained in the examples 2, 10, 11 were compared and found that the hardnesses of the molded bodies obtained in the examples 10, 11 were high to make the handling easy as compared with that of the molded body obtained in the example 2. The correlation between the displacement and the load is shown in FIG. 1.

According to the results, it was found that the solidification time was shortened and the hardness of an obtained molded body was increased by using modified MDI resin.

Further, regarding molded body obtained in the respective examples, the shrinkage percentage after drying was measured and found to be 6.5% in the case of the example 2, whereas extremely low, 0.3 and 0.5, in the example 10 and the example 11, respectively.

Examples 12, 13

Molded bodies were produced in the same conditions as those of the example 10 except that the solidification temperature was changed to 0° C. and further a catalyst was added in the case of example 13. As a result, no viscosity increase was observed at the time of casting in either example and casting work was easily carried out. Further in the case of example 12, separation from a form was possible in 2 hours after the solidification was started. In the case of example 13 in which a catalyst was added, separation from a mold was possible in 15 minutes after the solidification was started. For that, the solidification time was found controllable by the temperature and addition of the catalyst and as shown in the examples, it was found that the conditions could be set as to inhibit solidification from starting during the casting in a mold and make the casting work easy by controlling the temperature and addition of the catalyst. Further it was supposed that the solidification time could be shortened while the casting workability was kept high by cooling the slurry until the casting was started and carrying out heating immediate before or after casting.

Example 14

A molded body was produced in the same conditions as those of the example 3 except that 14.0 g of modified MDI substance was added and no catalyst was used.

As a result, the shortening of the solidification time, the improvement of the hardness of the molded body and the decrease of drying shrinkage were confirmed as same in the case of using alumina in the examples 10 to 13 for a powder.

Examples 15, 16

Molded bodies were produced in the same conditions as those of the examples 2 and 10 except that molded bodies with a cylindrical shape of outer diameter φ100×inner diameter φ90×height 100 mm were produced in the examples 2 and 10.

As a result, as shown in Table 4, a dried body excellent in the shape precision was obtained in the example 16 as compared with dried body obtained in the example 15. That was supposedly attributed to that the shrinkage at the time of drying was small. Further, when 5 molded bodies were produced in each example, one body showed crack occurrence in the example 15, whereas no cracking took place in the example 16. The results are collectively shown in Table 4.

Comparative Example 1

A molded body was produced in the same conditions as those of the example 2 except that a dispersion medium was changed to be water and the reaction catalyst addition amount was changed to 1.5 g and 2.0 g of the dispersing agent B was used as a dispersing agent in the example 2. As a result, although the fluidity of the slurry and the solidification state of the molded body were good, foams were introduced in the inside of the molded body owing to carbon dioxide gas generated by the reaction of water and the isocyanate to result in inferior density and strength of the sintered body to those in the case of example 2.

Comparative Example 2

A molded body was produced in the same conditions as those of the example 2 except that a dispersion medium was changed to be toluene and the reaction catalyst addition amount was changed to 1.5 g and 4.0 g of the dispersing agent B was used as a dispersing agent in the example 2. As a result, although the fluidity of the slurry was good, the slurry was not solidified.

Comparative example 3

A molded body was produced in the same manner as the comparative example 2 except that the cross-linking agent A was added as the cross-linking agent. Incidentally, the amount of toluene as the dispersion medium was decreased and the cross-linking agent A was added after its powder being dispersed in a dispersion medium to be a slurry in order to increase the powder concentration in the slurry. As a result, although the fluidity of the slurry was good, the slurry was not solidified in spite of addition of large quantities of the gelling agent and the cross-linking agent. That is, the gelling efficiency was low.

Comparative example 4

A molded body was produced in the same conditions as those of the comparative example 3 except that the amounts of the gelling agent and the cross-linking agent were increased to 24.0 g and 96.0 g, respectively.

As a result, although the fluidity of the slurry was good, the slurry was not solidified in spite of addition of large quantities of the gelling agent and the cross-linking agent. That is, the gelling efficiency was low. Cracks were formed in the molded body by drying and the density of the is sintered body after firing was as low as 3.9 g/cm$^3$ and at the time of measuring the strength of the sintered body, cracks were formed immediately after load application.

Comparative Example 5

A molded body was produced in the same conditions as those of the comparative example 1 except that 40.0 g of the prepolymer A (molecular weight of 16,000) was used as the gelling agent and the cross-linking agent B was used as the cross-linking agent and solidification was carried out at 80° C. for 4 hours.

As a result, the slurry was not at all fluidized and impossible to be poured in a form.

Comparative example 6

A molded body was produced in the same conditions as those of the comparative example 5 except that the amount of water, a dispersion medium, was increased to 300.0 g.

As a result, although the fluidity of the slurry was as high as that in the case of the example 6 to make casting possible, the solidification of the slurry was insufficient to give a molded body in gel state. That is, the gelling efficiency was low. Further, although the molded body had barely sufficient strength to handle it, the molded body was considerably deformed at the time of drying and moreover cracks were formed. That is, the shrinkage of the molded body was high and the shape precision was low attributed to the increase of the water amount.

Comparative example 7

A molded body was produced in the same conditions as those of the comparative example 5 except that the gelling agent was changed to prepolymer B with a low molecular weight (molecular weight 10,000 or low). As a result, although the fluidity of the slurry was good, the slurry was not solidified.

As described above, since the production method of powder-molded body according to the present invention includes slurry solidification by the reaction of a gelling agent and a dispersion medium, it can increase the gelling (the solidification) efficiency and provide a molded body with a high density, a low firing shrinkage, and a high shape precision while scarcely being accompanied with crack formation at the time of drying and firing.

What is claimed is:

1. A method for producing a powder-molded body, comprising:
    casting a slurry in a mold, said slurry containing a powder of at least one of a ceramic and a metal, in addition to an organic dispersion medium having reactive functional groups and a gelling agent; and
    chemically bonding said organic dispersion medium and said gelling agent to gel and solidify said slurry within said mold to obtain a molded body.

2. The method as claimed in claim 1, wherein said organic dispersion medium has two or more reactive functional groups.

3. The method as claimed in claim 1, further comprising a dispersion medium in addition to said organic dispersion medium, wherein said organic dispersion medium is present in an amount of 60% by mass or more with respect to the total amount of dispersion medium present in said slurry.

4. The method as claimed in claim 1, wherein said organic dispersion medium having reactive functional groups has a viscosity of 20 cps or lower at 20° C.

5. The method as claimed in claim 1, wherein said gelling agent has a viscosity of 3,000 cps or lower at 20° C.

6. The method as claimed in claim 1, wherein said organic dispersion medium has two or more ester bonds and said gelling agent has at least one of an isocyanate group and an isothiocyanate group.

7. The method as claimed in claim 1, wherein said gelling agent comprises MDI (4,4'-diphenylmethane diisocyanate) isocyanate having a basic chemical structure defined as the following chemical formula (1):

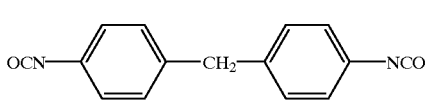

(1)

8. The method as claimed in claim 1, wherein said gelling agent comprises HDI (hexamethylene diisocyanate) isocyanate having a basic chemical structure defined as the following chemical formula (2):

(2).

* * * * *